Figure 1:
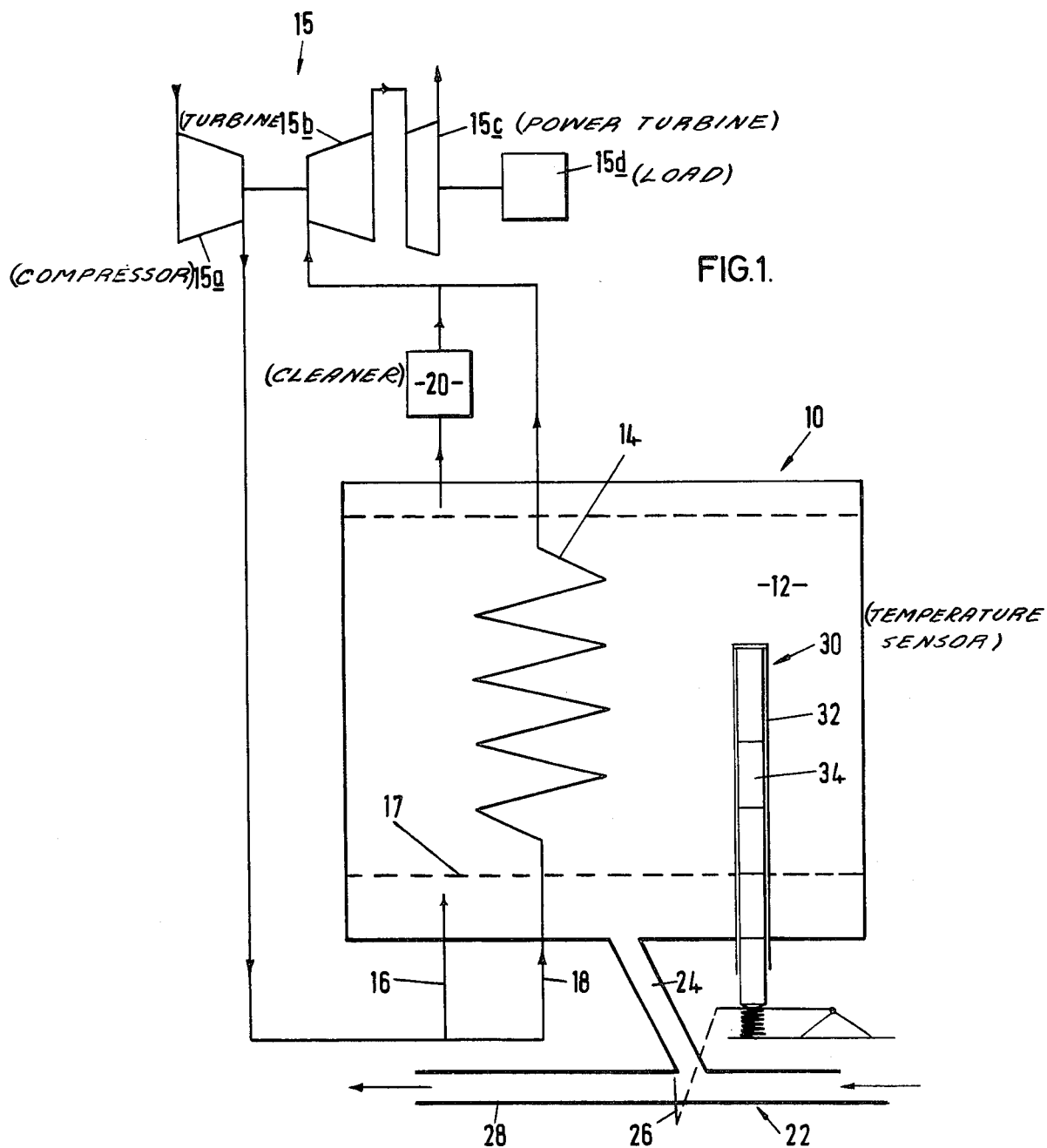

United States Patent [19]

Jubb

[11] 4,080,784

[45] Mar. 28, 1978

[54] GAS TURBINE ENGINE POWER PLANT WITH A COAL BURNING FLUIDIZED BED

[75] Inventor: Albert Jubb, Kenilworth, England

[73] Assignee: Rolls-Royce Limited, London, England

[21] Appl. No.: 620,271

[22] Filed: Oct. 7, 1975

[30] Foreign Application Priority Data

Oct. 17, 1974 United Kingdom .............. 44947/74

[51] Int. Cl.² .................................................. F02C 9/06
[52] U.S. Cl. ..................... 60/39.28 T; 60/39.46 S; 110/101 CA; 60/39.18 C
[58] Field of Search ............ 60/39.12, 39.2, 39.46 S, 60/39.47, 39.28 T, 39.18 C; 110/101 CA, 101 CF, 101 A, 101 R

[56] References Cited

U.S. PATENT DOCUMENTS

| 2,161,892 | 6/1939 | Benjamin | 110/101 CB |
| 2,215,067 | 9/1940 | Denison | 110/101 CA |
| 2,295,045 | 9/1942 | Mettler | 110/101 CA |
| 2,305,785 | 12/1942 | Jendrassik | 60/39.12 X |
| 2,511,017 | 6/1950 | Sherban | 110/101 A |
| 2,714,670 | 8/1955 | Linder | 60/39.12 X |
| 3,271,951 | 9/1966 | Netlel | 60/39.2 X |
| 3,298,338 | 1/1967 | Clark | 110/101 R |
| 3,446,012 | 5/1969 | Foster-Pegg | 60/39.02 |
| 3,847,092 | 11/1974 | Gilbert | 110/101 R |
| 3,871,172 | 3/1975 | Villiers-Fisher | 60/39.02 |

FOREIGN PATENT DOCUMENTS 657,346 9/1951 United Kingdom ............... 60/39.12

Primary Examiner—Clarence R. Gordon
Attorney, Agent, or Firm—Cushman, Darby & Cushman

[57] ABSTRACT

A gas turbine engine power plant having a coal burning fluidized bed utilized as the heating source for the power plant. The fluidized bed comprises inerts and coal in which is immersed a temperature sensitive device, the signal from which is used to control the supply of coal to the bed to thereby maintain the bed at a predetermined temperature and to limit the bed temperature to a predetermined maximum value. The bed can be fluidized by the flow of compressed air from the compressor of the gas turbine engine power plant and the whole of the compressor delivery air flows through the bed in direct chemical contact with the bed materials and is then cleaned prior to delivery to the turbines of the power plant from which it is discharged to atmosphere.

4 Claims, 5 Drawing Figures

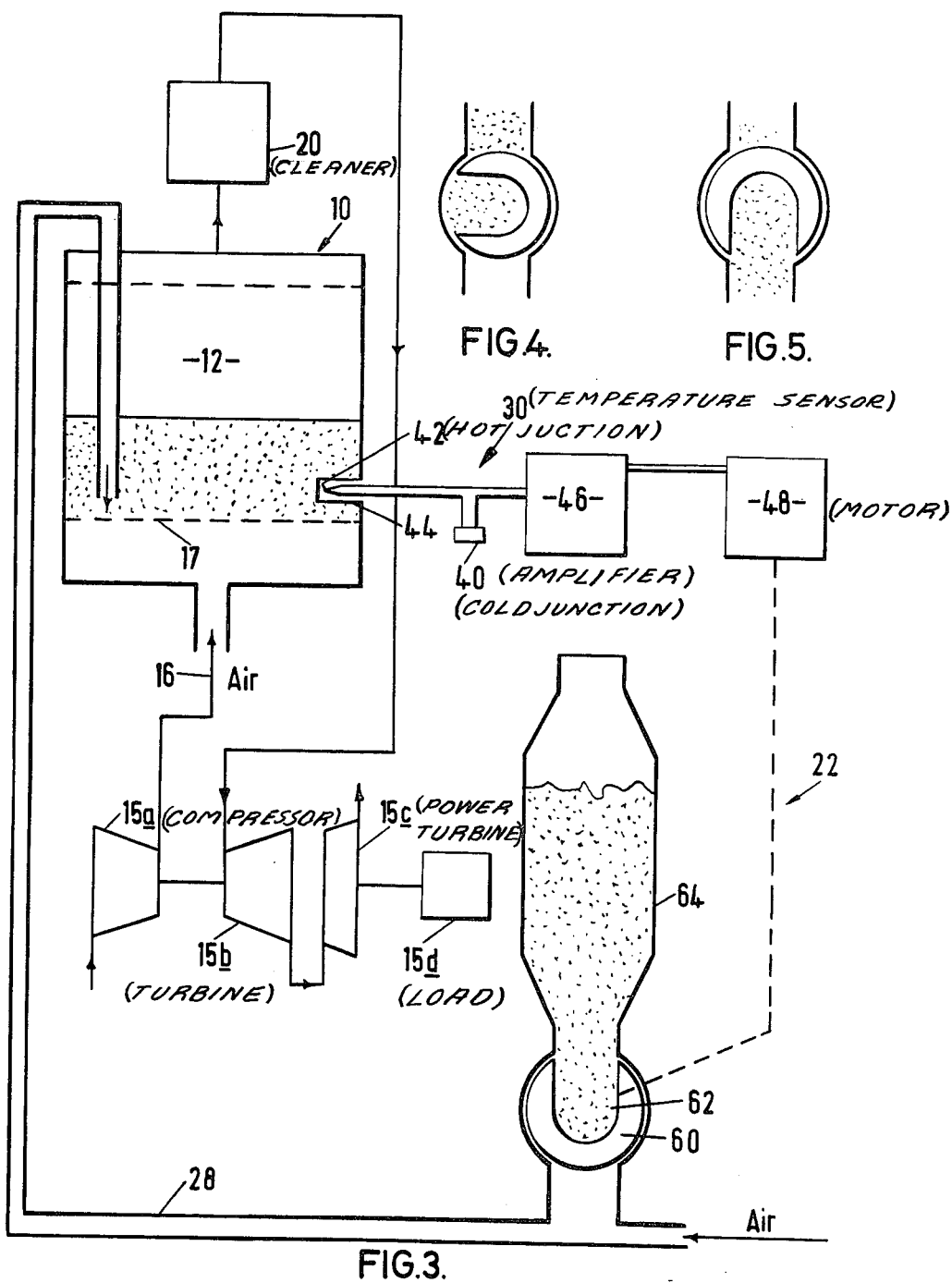

GAS TURBINE ENGINE POWER PLANT WITH A COAL BURNING FLUIDIZED BED

This invention relates to coal burning fluidised beds and is particularly concerned with maintaining sufficient coal within the bed and supplying coal to the bed.

If a fluidised bed combustion system has too little fuel, combustion will not be sustained and sudden gross additions of extra coal may produce large quantities of coal gas initially which may not burn completely.

The present invention seeks to overcome this problem by providing a fuel supply system which supplies fuel to the fluidised bed in response to a function of the bed condition.

Accordingly in the present invention there is provided a coal burning fluidised bed having bed temperature sensing means arranged to produce a signal dependent upon the bed temperature coal supply means and a coal supply control means operable to control the supply of coal to the fluidised bed in response to a signal from the bed temperature sensing means.

In one embodiment of the present invention, the temperature sensitive device comprises a stainless steel tube which encloses a quartz rod, the device being immersed in the fluidised bed. A relative movement between the tube and the rod will occur when the bed temperature changes, producing the signal which actuates the coal supply control means.

The coal supply means may comprise a duct to the bed along which a suspension of coal in air is blown at intervals and the coal supply control means comprises a valve which is movable in response to the signal from the temperature sensitive device, the valve moving to allow the suspension of coal in air to flow either to the bed or to return to a coal store.

In another arrangement the end of the quartz rod may be shaped as a scoop and be extendable into the duct, the amount by which the scoop extends into the duct depending on the degree of relative movement between the tube and the quartz rod.

In a further arrangement, the bed temperature sensing means comprises a thermocouple in a ceramic sheath in the fluidised bed, the output signal of which can be compared with a reference signal and any error signal is amplified and used to control a motor of the coal supply means. The motor is arranged to drive the valve of a coal hopper so as to control the supply of coal to the duct leading to the fluidised bed.

Figure 2:
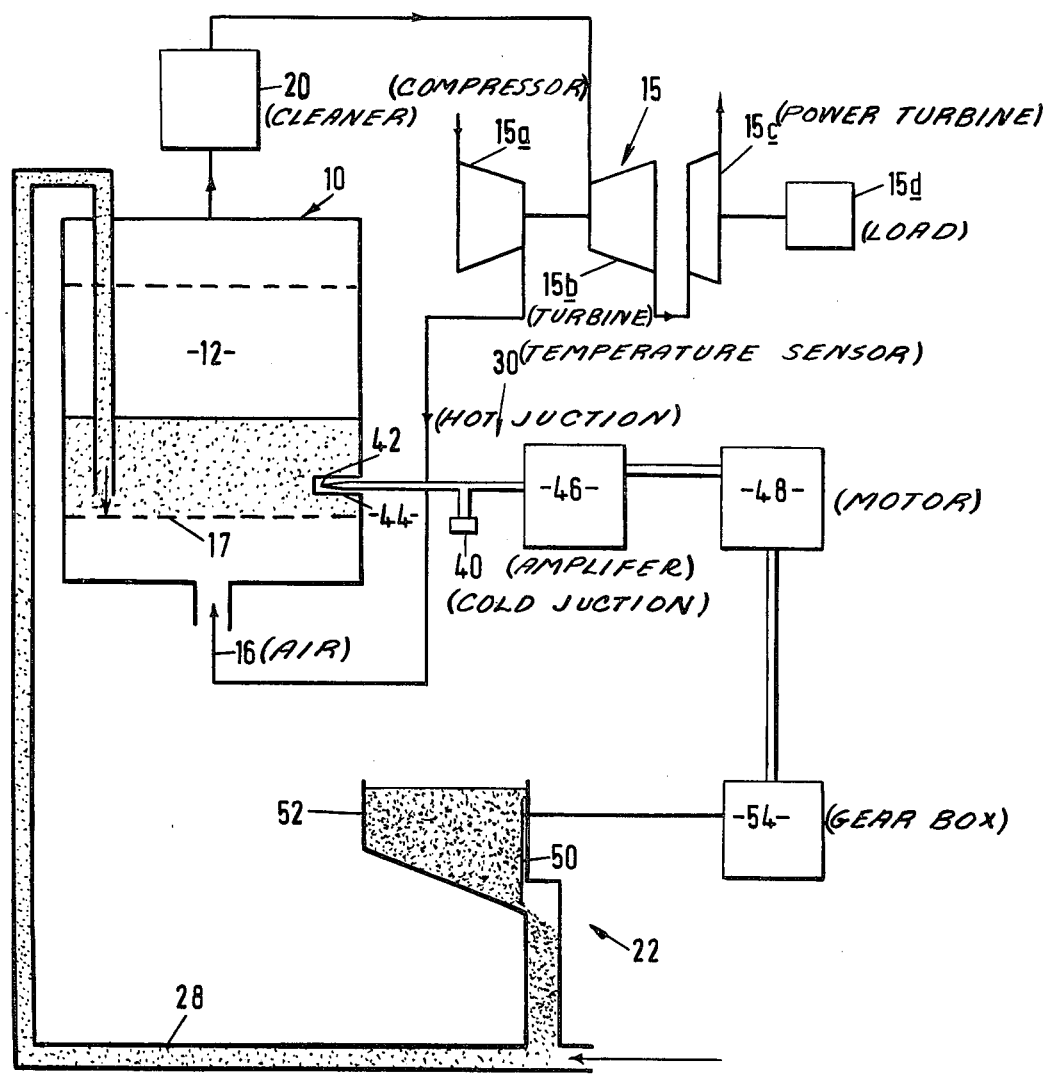

The present invention will now be more particularly described with reference to the accompanying drawings in which:

FIG. 1 shows diagrammatically one form of coal burning fluidised bed according to the present invention in association with a gas turbine engine power plant, FIG. 2 shows diagrammatically a further form of coal burning fluidised bed according to the present invention in association with a gas turbine engine power plant, FIG. 3 shows diagrammatically a still further form of coal burning fluidised bed according to the present invention in association with a gas turbine engine power plant, and FIGS. 4 and 5 both show a detail of the coal supply apparatus of fluidised bed shown in FIG. 3.

Referring to FIG. 1, a coal burning fluidised bed system 10 comprises a fluidised bed 12 of coal ash and unburnt coal which contains heat transfer surfaces 14 and is arranged to receive compressed air from the compressor of a gar turbine engine power plant 15. The power plant 15 comprises a compresser 15a driven by a turbine 15b and power turbine 15c arranged to drive a load 15d which may, for example be an electrical generator or a pump. The compressed air flows from the compressor 15a through the bed in two flow paths, one 16 directly through the bed providing the combustion and fluidising air through a distributor plate 17 and the other 18 which flows through the heat transfer surfaces 14. The two streams of heated fluid, i.e., heated air in the stream 18 and heated air and exhaust gases leaving the fluidised bed 12, then flow to the turbine 15b of the engine, the heated air and the exhaust gases from the fluidising bed first passing through a cleaner 20 to remove any deleterious substances.

The bed also has a coal supply means 22 to the form of a duct 24 along which a suspension of coal in air can be blown at intervals into the bed. The duct 24 has a valve 26 which is controlled to induce the fuel to flow into the bed or to return the fuel to a fuel store (not shown) along a duct 28.

A bed temperature sensing means 30 in the form of a stainless steel tube 32 enclosing a quartz rod 34 is immersed in the bed, so that changes in the bed temperature produce relative movement between the rod and the tube. This relative movement is used to operate the valve 26 by means of a linkage 30 which is only diagrammatically shown since any suitable position transmitting system can be used.

In operation, a suspension of coal in air is blown along the duct at intervals of approximately once every 10 seconds. If the bed is at the correct temperature, the valve 26 is in a position to return the coal to the store. If the bed temperture is reduced, the relative movement between the tube and the rod is used to operate the valve so that some coal is induced to flow into the bed. The temperature rises and signal produced by the temperature sensitive device operates the valve to cause the next pulse of fuel to be returned to the store.

In an alternative arrangement not shown, the end of the quartz rod is formed as a scoop which is extendable by virtue of the relative movement between the tube and the rod as the bed temperature drops, into the duct carrying the suspension of coal in air. When the scoop is in operation, side loads will be produced on the rod which will hold the scoop in position. Therefore when the bed is too cold, more fuel is added until the bed temperature rises to the required valve and the scoop is withdrawn. During the period when coal is not being blown alog the tube, the quartz rod is free to move under expansion forces and is therefore not disturbed by forces associated with the coal supply system.

Any number of coal supply ducts may be provided, e.g. 10, and could be blown sequentially for 1 second intervals over a 10 second cycle so that coal can be fed to different parts of the bed according to local temperatures of the bed as measured by individual temperature sensitive devices.

Referring to FIG. 2, the bed temperature sensing means 30 comprises a thermocouple having a cold junction 40 and a hot junction 42 enclosed in ceramic sheath 44 in the fluidised bed 12. The signal from the thermocouple is compared with a reference signal and any resulting error signal is amplified by an amplifier 46. The amplified error signal is used to control a reversing electric motor 48 e.g. of the stepper type and the motor operates a sluice-gate 50 of a coal hopper 52 through a reduction gear box 54. If the thermocouple signal is greater than the reference signal then less coal is required and thus the sluice gate 50 lowers to reduce the supply of coal along the duct 28 to the fluidised bed and vice versa.

Referring to FIGS. 3, 4 and 5 the bed temperature sensing means 30 is as described with reference to FIG. 2 but the amplified error signal is used to control the electric motor 48 which can now be of the two phase or stepper type. The motor drives a rotary valve 60 of known type which has one or more sealed pockets 62 into which coal falls from a suitably pressurised hopper 64 (FIG. 3). Operation of the valve (FIG. 5, FIG. 4 shows an intermediate position) causes coal to be discharged into the conveying duct 28 and the coal is then blown into the fluidised bed by a flow of air. The speed of rotation of the valve controls the rate of coal supply and thus the amplified error signal is used to control the rate of rotation of the valve and thus maintain the required bed condition.

It will be noted that the embodiments of the present invention shown in FIGS. 2 to 5 inclusive do not include heat transfer surfaces in the bed such as heat transfer surfaces 14 shown in FIG. 1. At full power, substantially all the air from the compressor 15a flows through the bed which comprises inerts and a small amount of coal and after cleaning in the cleaner 20 the heated air and exhaust gases produces power to drive the compressor and an external load. Of this air flow, only about one quarter to one third is required for combustion and thus there is considerable excess air and the outlet gas temperature will be in the range 800°–1000° C. If excess coal is fed to the bed for a given airflow, the temperature in the bed will rise beyond the limitations set by the properties of the coal ash, leading to clinkering or to exceeding the limitations of the ducting, the hot gas cleaning systems or the gas turbine engine itself. The rate of temperature rise is controlled by the supply of excess coal and the thermal inertia of the bed and the arrangements shown in FIGS. 2 to 5 control the rate at which coal is supplied to the bed.

What I claim is:

1. A gas turbine engine power plant comprising:
   a compressor having a delivery end for discharging compressed air;
   a coal burning fluidized bed for coal ash and unburnt coal;
   means for supplying all of the compressed air from the delivery end of said compressor into the coal burning fluidized bed to fluidizing the coal ash and unburnt coal therein and to have direct chemical contact with the coal ash and unburnt coal and to be heated thereby;
   a cleaner for receiving and cleaning all of the heated air and exhaust gases from said fluidized bed;
   a compressor driving turbine in series with a power turbine which drives a load;
   means for supplying all of the heated air and exhaust gases from said cleaner first to clean compressor driving turbine and then to said power turbine and from said power turbine to atmosphere;
   a coal supply means connected to said fluidized bed for supplying coal suspended in compressed air to the fluidized bed;
   a coal supply control means operatively connected to said coal supply means for controlling the supply of coal delivered by said coal supply means to said fluidized bed; and
   a bed temperature sensing means operatively connected to said fluidized bed and to said coal supply control means, said sensing means being arranged to produce signals dependent on bed temperature to thereby selectively operate said coal supply control means in response to such signals so as to cause said coal supply means to deliver more coal to said bed when said bed temperature drops below a predetermined minimum value and to cut off delivery of coal to said bed to thereby limit bed temperature to a predetermined maximum value.

2. A gas turbine engine power plant as claimed in claim 1 in which the coal supply means comprises a hopper containing coal, an outlet controlled by the coal supply control means a duct leading to the fluidized bed along which coal can be blown by a supply of compressed air.

3. A gas turbine engine power plant as claimed in claim 1 in which said bed temperature sensing means comprises a stainless steel tube enclosing a quartz rod movable relative to the tube and operatively connected to said coal supply control means for controlling the same.

4. A gas turbine engine power plant as claimed in claim 1 in which said bed temperature sensing means comprises a thermocouple having an output signal which is compared with a reference signal to give an error signal, an amplifier for receiving said error signal and amplifying the same, said coal supply means including a motor operatively connected to said amplifier and controlled thereby.

* * * * *